May 4, 1954 — R. L. SINSHEIMER — 2,677,819
OBSTRUCTION RADAR SYSTEM
Filed Feb. 20, 1946
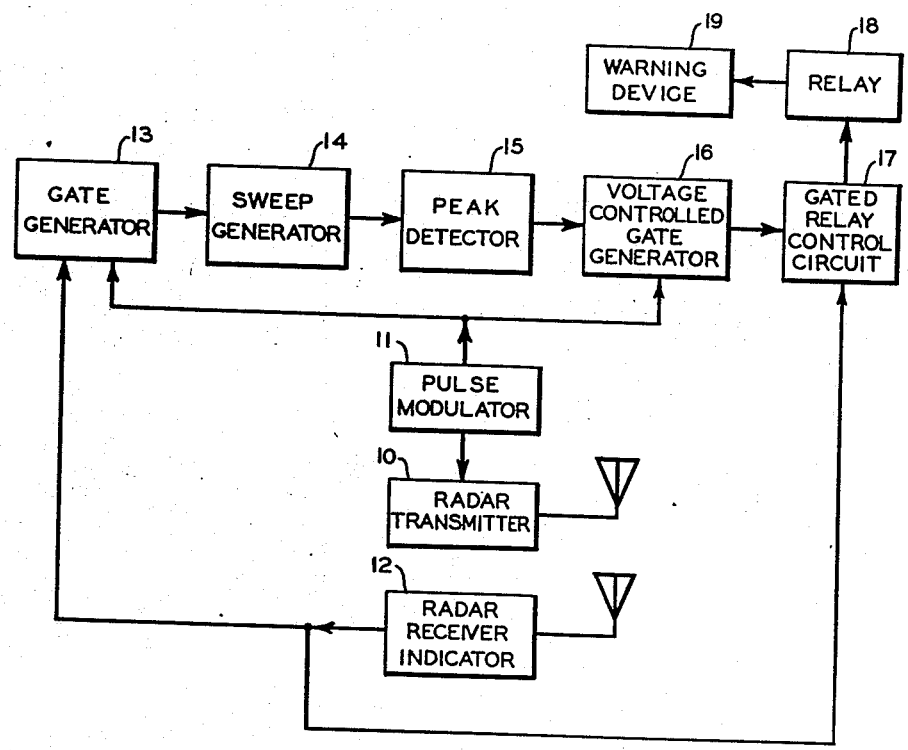
INVENTOR.
ROBERT L. SINSHEIMER
BY M. C. Hayes
ATTORNEY Patented May 4, 1954

2,677,819

UNITED STATES PATENT OFFICE 2,677,819

OBSTRUCTION RADAR SYSTEM

Robert L. Sinsheimer, Cambridge, Mass., assignor, by mesne assignments, to the United States of America as represented by the Secretary of the Navy Application February 20, 1946, Serial No. 649,088

8 Claims. (Cl. 343—7)

This invention relates to radar systems and in particular to radar systems used for avoiding obstacles lying in the path of a moving vehicle.

This invention is applicable generally to all types of vehicles to which obstacle avoidance presents a problem, and in particular to aircraft for providing a warning of the presence of any obstruction, such as mountains or other aircraft, that is closer to the aircraft than a predetermined distance, such as the distance to the ground below.

Such a system is disclosed in Patent No. 2,499,349, issued March 7, 1950 to W. A. Ayres and assigned to Sperry Gyroscope Company, and entitled Obstacle Avoidance System.

Briefly, the system described in the above identified application contains a pulsed transmitter and a receiver both operating in conjunction with control and indicating devices. The transmitter projects short pulses of electromagnetic energy forward from the moving vessel. Any obstruction in the path of the energy pulses reflects echo pulses back toward the receiver where the echoes are received, amplified, and coupled to the control and indicating devices. These devices are so arranged that when the obstruction is within a predetermined distance from the vessel a warning is indicated and the vessel is controlled to avoid the obstruction.

The principal object of this invention is to provide new and improved means for actuating a warning indicator when an obstruction is within a predetermined distance from and in the path of a moving vessel equipped with a radar system.

A further object of this invention is to provide means for actuating a warning indicator when an obstruction is closer to an aircraft than the terrain below.

Other and further objects will be apparent from the following specification when taken with the accompanying drawing which is a block diagram of a radar system employing an embodiment of this invention.

The embodiment of this invention as shown in the drawing contains a typical search radar system composed of radar transmitter 10, pulse modulator 11, and radar receiver-indicator 12 complete with the necessary antennas to make an operating system.

In this embodiment of the invention, gated relay control circuit 17 is made operative by a voltage gate whose duration is equal to the time required for the transmitted pulse to travel to earth and return. Relay control circuit 17 is also supplied with video signals from receiver 12, which video signals can actuate relay 18 only if they occur during the duration of the gate. Thus a video signal within the altitude signal can operate the circuit to energize the relay and thereby operate warning device 19, which may be a light or a buzzer or may produce some indication on the radar indicator to warn of the danger.

The voltage gate used to make relay control circuit 17 operative is produced by gate generator 16 which can be of conventional multivibrator type. This gate is initiated by a pulse from modulator 11, and thus the gate starts with the transmitted pulse from radar transmitter 10. The duration of the gate is controlled by the direct voltage output from peak detector 15, which voltage is made proportional to the altitude of the aircraft. To accomplish this, a second gate generator 13, a conventional "one-shot" multivibrator, is initiated by the pulse from modulator 11 and is turned off by the first video signal (this is normally the altitude signal) from receiver 12. This gate is coupled to sweep generator 14 and is there used to produce a sawtooth of voltage increasing with time after the transmitted pulse. The peak voltage reached by this sawtooth depends upon the length of the initiating gate and thus normally upon the altitude of the aircraft. Detector 15 charges a condenser to the peak voltage of this sawtooth voltage and this peak voltage is used to control the duration of the gate produced by generator 16. The discharge time constant of the detector condenser is made long to prevent an echo pulse inside the altitude range from de-energizing the relay control circuit, but is made short enough to allow the controlling gate to follow changes in altitude of the aircraft.

If a video signal is returned by an object closer to the receiver than the terrain which returns the normal altitude signal, sweep generating gate 13 is turned off, as gate generator 13 is disabled by the first received signal. This does not, however, affect the altitude gate as the condenser in detector circuit 15 remains charged to the peak voltage produced by the previous altitude signals. Thus relay control circuit 17 remains operative for the full altitude period and actuates the warning mechanism when the video pulse appears.

It is not intended that this invention be limited to the specifications as set forth, but is to be limited only by the following claims.

What is claimed is:

1. Apparatus for avoiding collision between an aircraft and an obstacle lying in the path of flight of said aircraft comprising a radar system including means for generating a voltage gate, said gate being actuated by the modulator pulse of said radar system and said gate being turned off by the altitude signal received by said radar system; means for generating a sawtooth of voltage, the peak value of said sawtooth of voltage being controlled by the duration of said voltage gate; means including a peak detector for generating a voltage proportional to said peak value of said sawtooth of voltage; means for generating a second voltage gate, said second gate being actuated by the modulator pulse of said radar system, and the duration of said second gate being controlled by said voltage from said peak detector; a relay means for energizing said relay in response to signals derived from reflections received from an obstacle when said signals from said obstacle are received during the duration of said second gate; and a warning device, and means for actuating said warning device when said relay is energized.

2. Obstacle warning apparatus for an aircraft comprising, in combination, a radio echo detection system including means for radiating pulses of electromagnetic energy forwardly along the flight path of said aircraft, means responsive to the modulator pulse of said detection system and echo signals received from the terrain below said aircraft for continuously generating a voltage proportional to the altitude of said aircraft, means responsive to the modulator pulse of said detection system and said voltage for generating a gating pulse having a duration directly proportional to the altitude of said aircraft, a relay operated warning device, a control circuit for said relay, and means for applying said gating pulse and echo signals from said detection system to said control circuit, said control circuit being arranged to actuate said relay and said warning device only when echo signals received from an obstacle occur during the period of said gating pulse.

3. Obstacle warning apparatus for an aircraft comprising, in combination, a radio echo detection system including means for radiating pulses of electromagnetic energy forwardly along the path of flight of said aircraft, means responsive to the modulator pulse of said detection system and echo signals received from the terrain below said aircraft for generating a first gating pulse having a duration dependent on the altitude of said aicraft, means for generating a sawtooth voltage having a peak amplitude proportional to the duration of said first gating pulse, detector means including a long time-constant circuit for producing a voltage having a magnitude proportional to the average peak amplitude of said sawtooth voltage, means responsive to the modulator pulse of said detection system and said voltage for generating a second gating pulse having a duration proportional to the average altitude of said aircraft, a warning device, a control system for said device, and means for applying said second gating pulse and echo signals from said detection system to said control circuit, said control circuit being arranged to actuate said warning device only when echo signals occur during the period of said second gating pulse.

4. Apparatus for avoiding collision between an aircraft and an obstacle lying in the path of said aircraft comprising, in combination, a radio echo detection system including a pulse modulator, a transmitter for radiating pulses of electromagnetic energy in a beam forwardly along said path and means for receiving echo pulses, means for generating a first voltage gate initiated by the modulator pulse of said detection system and terminated by an echo signal reflected from the terrain below said aircraft, means for generating a voltage having a magnitude proportional to the duration of said first voltage gate, means for generating a second voltage gate initiated by the modulator pulse of said detection system and having a duration proportional to the magnitude of said voltage, a relay-operated warning device, and a control circuit connected to said relay and arranged to actuate said warning device upon the coincident application thereto of said second voltage gate and echo signals received from an obstacle in the path of said aircraft.

5. Apparatus for avoiding collision between an aircraft and an obstacle lying in the path of said aircraft comprising, in combination, a radar system including a modulator, a transmitter and a receiver, means for generating a first gating pulse initiated by the modulator pulse from said radar system and terminated by an echo signal reflected from the terrain below said aircraft whereby the duration of said first gating pulse is proportional to the altitude of said aircraft, means including a long time-constant circuit coupled to said first gate generating means for producing a voltage having a magnitude proportional to the altitude of said aircraft, means for generating a second gating pulse initiated by the modulator pulse from said radar system and having a duration dependent on the magnitude of said voltage, a warning device, a relay operatively associated with said warning device, and a control circuit coupled to said relay, said second gating pulse being applied to said control circuit and permitting energization of said relay when echo signals received from an obstacle during the period of said second gating pulse are applied to said control circuit.

6. Apparatus for avoiding collision between an aircraft and an obstacle lying in the path of said aircraft comprising, in combination, a radio echo detection system including means for radiating pulses of electromagnetic energy in a beam forwardly along said path and means for receiving echo signals, means for generating a first voltage gate initiated by said pulses and terminated by an echo signal returned from the terrain below said aircraft, means for generating a sawtooth voltage having a peak amplitude proportional to the duration of said first voltage gate, means including a peak detector for producing a voltage having a magnitude proportional to the peak amplitude of said sawtooth voltage, means for generating a second voltage gate initiated by said pulses and having a duration proportional to the magnitude of said voltage, a relay-operated warning device, a control circuit for said relay, and means coupling said second voltage gate to said control circuit for rendering said relay operative to actuate said warning device in response to echo signals from an obstacle when said echo signals are received during the period of said second voltage gate.

7. An obstacle warning system for aircraft comprising, in combination, a radio pulse echo ranging system disposed within said aircraft, means responsive to pulses returned from the terrain below said aircraft for producing variable length control signals, the duration of which is proportional to the aircraft's altitude, a gating circuit, means for synchronizing the application of said control signals to said gating circuit with the transmission of a radio pulse whereby said circuit is periodically conditioned for operation, means for applying reflected pulses to said gating circuit whereby said circuit is operated whenver a pulse is returned from an obstacle at a distance less remote than the altitude of said aircraft, and means responsive to the operation of said gating circuit for providing an indication.

8. An obstacle warning system for aircraft comprising, in combination, a radio pulse echo ranging system disposed within said aircraft, means responsive to pulses returned from the terrain below said aircraft for producing variable length control signals, means for rendering said producing means unresponsive to pulse-to-pulse variations in altitude whereby the control signal assumes a duration corresponding to the average altitude of said aircraft, a gating circuit, means for synchronizing the application of said control signal to said gating circuit with the transmission of said radio pulses whereby said circuit is periodically conditioned for operation, means for applying reflected pulses to said gating circuit whereby said circuit is operated whenever a pulse is returned from an obstruction less remote than the average altitude of said aircraft, and means responsive to the operation of said gating circuit for prividing an indication.

References Cited in the file of this patent

UNITED STATES PATENTS

| Number | Name | Date |
|---|---|---|
| 2,403,527 | Hershberger | July 9, 1946 |
| 2,412,703 | Wolff | Dec. 17, 1946 |
| 2,417,136 | Smith | Mar. 11, 1947 |
| 2,421,018 | Rosa | May 27, 1947 |
| 2,428,058 | Wise | Sept. 30, 1947 |
| 2,485,584 | Ginzton | Oct. 25, 1949 |
| 2,494,339 | Keister | Jan. 10, 1950 |
| 2,499,349 | Ayres | Mar. 7, 1950 |
| 2,521,016 | Miller | Sept. 5, 1950 |
| 2,527,769 | Sinsheimer | Oct. 31, 1950 |

FOREIGN PATENTS

| Number | Country | Date |
|---|---|---|
| 108,556 | Australia | Sept. 14, 1939 |